United States Patent [19]

Kerpchar

[11] Patent Number: 5,138,449
[45] Date of Patent: Aug. 11, 1992

[54] ENHANCED DEFINITION NTSC COMPATIBLE TELEVISION SYSTEM

[76] Inventor: Michael Kerpchar, 17 Nokomis Ave., Lake Hiawatha, N.J. 07034

[21] Appl. No.: 667,038

[22] Filed: Mar. 8, 1991

Related U.S. Application Data

[63] Continuation-in-part of Ser. No. 345,984, May 2, 1989.

[51] Int. Cl.⁵ .................................................. H04N 7/01
[52] U.S. Cl. ...................................... 358/140; 358/141
[58] Field of Search ............... 358/152, 140, 148, 153, 358/147, 141

[56] References Cited

U.S. PATENT DOCUMENTS 4,251,835  2/1981  Eriksen ........................... 358/152 X
4,451,848  5/1984  Okada et al. ..................... 358/147 X
4,531,152  7/1985  Lemelson et al. .................. 358/141
4,800,426  1/1989  Glenn ............................. 358/147 X Primary Examiner—Victor R. Kostak
Attorney, Agent, or Firm—Ribis, Graham & Curtin

[57] ABSTRACT

This invention relates to methods for transmitting and receiving high resolution television pictures which utilizes the present channel bandwidths and is compatible with present day receivers. Four fields are utilized to produce two interlaced frames. The camera is adjusted so that each scene is converted into four fields of two frames and a signal is sent to inform the receiver to interlace the two frames. Compatibility is obtained since in a 525 line receiver two of the fields are displayed on top of the other two fields.

8 Claims, 6 Drawing Sheets

CONVENTIONAL T-V RASTER

ENHANCED DEFINITION NTSC COMPATIBLE TELEVISION SYSTEM

This application is a continuation-in-part of patent application Ser. No. 345,984 filed May 2, 1989.

This invention relates to methods for transmitting and receiving high resolution television pictures, and more particularly to methods for transmitting and receiving high resolution pictures utilizing present channel bandwidths via signals which are compatible with presently existing moderate resolution television receivers.

BACKGROUND OF THE INVENTION

Improvements in the picture received by television receivers is limited by two important factors which are not related to the receiver technology. The first limitation is the 525-line format made standard for the United States television industry many years ago (National Television Standards Committee or NTSC). This places a limit of 525 resolution lines from top to bottom. The second limit is imposed by the broadcasting bandwidth allotted to commercial television. The bandwidth for video signals in domestic television is limited by government regulation to approximately 4.2 mHz. and the method of transmitting/receiving television pictures limits the resolution to this bandwidth. Most present day television receivers do not use the entire 4.2 mHz bandwidth of the electromagnetic frequency but have a composite RF/IF/video bandwidth of approximately 3 mHz. This places a limit to available horizontal resolution. The resultant television picture is similar to something between super-8 and 16 mm movies but well below the quality available from 35 mm movies. The obvious way to improve television images is to increase the number of scan lines (Europe uses 625) which increases the bandwidth. Closed circuit television with 1000 scan lines and a bandwidth in the vicinity of 16 mHz has been demonstrated to give picture quality approaching 35 mm. film. Although some cable transmission is not limited by the bandwidth it is limited to the ability of conventional television receivers to only receive 525 lines. Although television signals are presently broadcast utilizing 525 lines of picture viewing, the actual number of lines seen by the viewer is some what less since some of the lines are used up for auxiliary transmission. A NTSC television signal consists of blanking pulses, luminance data, chrominance data and sync pulses.

A great deal of effort has been expended over the years to increase the fidelity of the picture received. If the picture does not have to be transmitted the problem is simplified since transmission bandwidth plays a lesser part in developing increased fidelity. Because of the crowded air ways there appears little likelihood that the bandwidth which can be used for television transmission will be increased although the increase use of cable may reduce this problem. The primary disadvantage of the various systems which have been developed is that they render existing receivers obsolete in that the systems are not compatible with existing receivers.

In standard television transmission the picture or scene seen by the camera lens is converted into electrons. The standard system of transmitting the picture or scene is to break up the maximum number of lines, i.e. 525 into two fields of 262.5 lines each. The sene is scanned twice and the resulting two fields generated are interlaced to form one frame. The scene is scanned left to right in a slightly declining direction and a signal is included in the transmission to stop the signal while the electron direction is returned to the left to begin another line slightly lower than the first scan. Each line is made up of a series of electrons or pixels which correspond in intensity to the shades in the scene for which the pixel represents. Black areas are present between each scan line because of the return to the left side of the picture.

One of the more recent suggestions for improving the fidelity of the viewing picture is to remove the black lines so the viewer is less conscious of scan lines. This is done by digitalizing the received signal so that one line is generated twice and displayed on the screen in a slight offset thereby filling in the normal black lines. Additional lines can be generated in the same manner. Although such a system does not actually increase the fidelity since the identical picture appears on the screen with the same pixels in parallel lines, to the viewer there appears to be greater fidelity.

U.S. Pat. No. 4,623,913 issued to Fling on Nov. 18, 1986, discloses a system where the conventional incoming signal is doubled in the receiver to produce twice the number of lines. U.S. Pat. No. 4,794,456 issued to Tsinberg on Dec. 27, 1988 relates to transmitting two different pictures and therefore using two broadcast bands. One transmits high definition pictures and the other the conventional picture. U.S. Pat. No. 3,200,195 issued to Davies et al on Aug. 10, 1965 allows transmission on one band but requires two viewing tubes or the equivalent, which are then combined into one picture by optical projection. IBM Technical Disclosure Bulletin, Vol. 21 No. 5, dated Oct., 1978 suggest the conversion of the 525 line, two frame signal to a four frame picture utilizing an analog buffer memory. Such a device is a charge-coupled device operated in analog mode and normally refreshed so the net gain of the refresher circuity just offsets the loss through the CCD shift registry. The buffer converts the two frames to four while holding the frames and then releasing them in sequence.

OBJECTS OF THE INVENTION

It is an object of the invention to provide a television system of increased fidelity which is compatible with present day receivers. Another object of the invention is to provide such a system that can be transmitted on the standard band width. Other objects and the advantages of the invention, will appear from the following detailed description of the invention when read in conjunction with the drawings.

THE DRAWINGS

Figure 4:
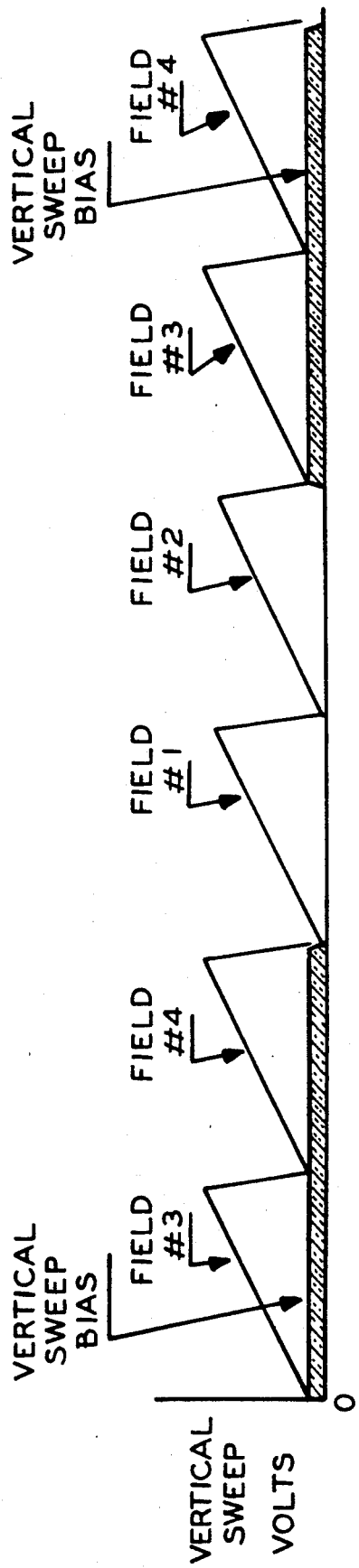

FIG. 4 is graft showing the signal being transmitted with a vertical bias for field three and four. FIG. 4 is a graft showing the signal being transmitted with a vertical bias for fields #3, and #4. To avoid confusion it should be noted that field transmission for a 525 line receiver is always 1, 2, 1, 2, . . . etc. From the point of view of a 1050 line receiver, however, the fields appear as 1, 3, 2, 4, 1, 3, 2, 4, . . . etc. Proper placement of the vertical bias converts the fields internally so that a 1050 line receiver interprets the transmitted fields as 1, 3, 2, 4, instead of 1, 2, 3, 4.

Figure 5:
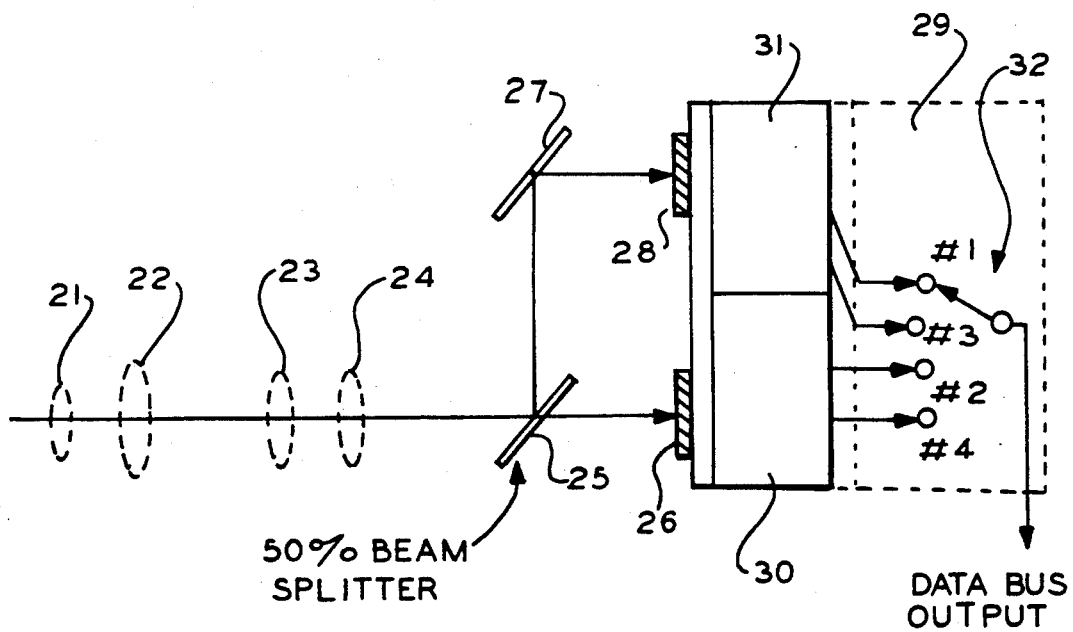

FIG. 5 is a schematic drawing of a television camera modified in accordance with the invention.

Figure 6:
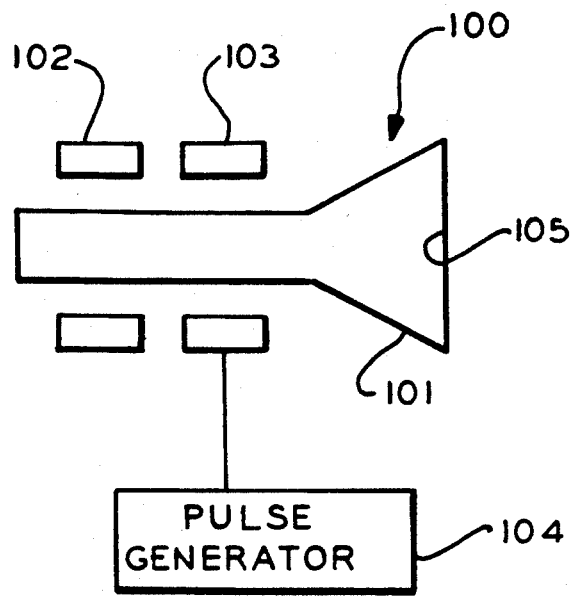

FIG. 6 is a schematic drawing of a television picture tube modified in accordance with the invention with two deflection coils and a pulse generator.

Figure 7:
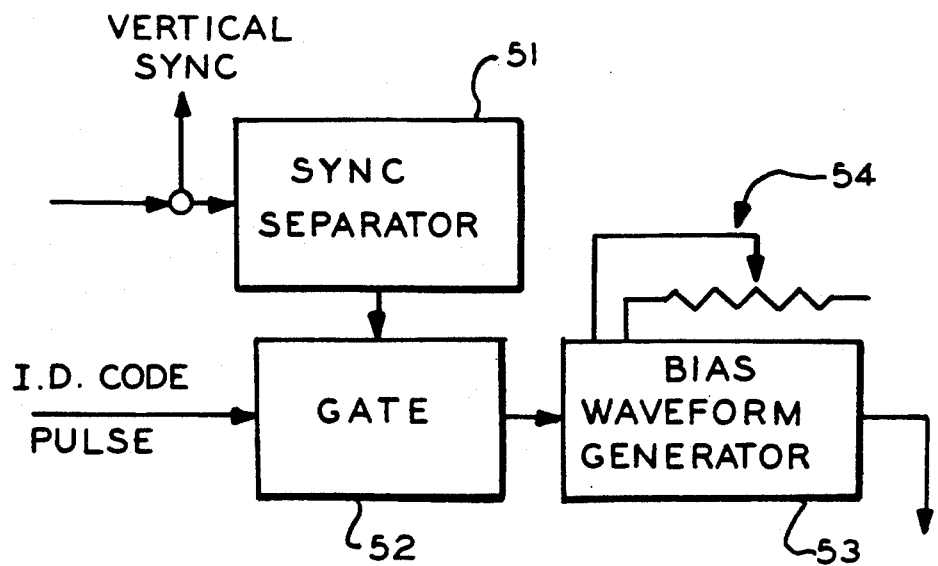

FIG. 7 is a block diagram of components to create the deflection of scan lines on the viewing surface.

Figure 8:
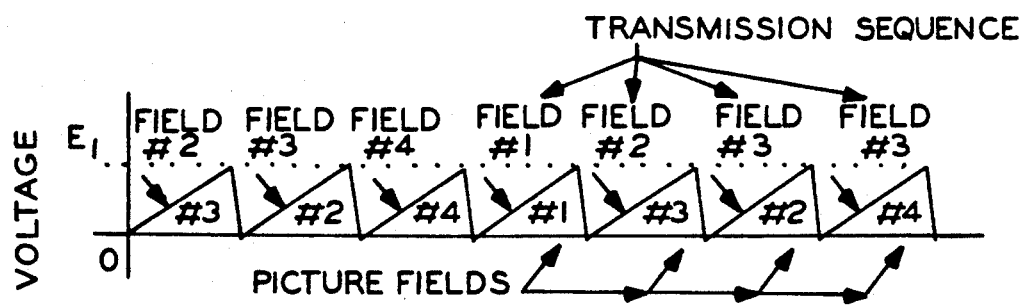

FIG. 8 is a graft showing the transmission sequence in television signal transmission.

Figure 9:
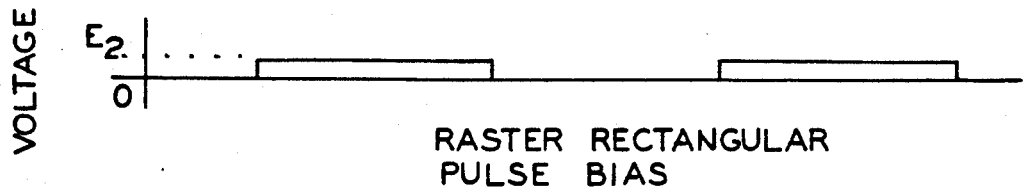

FIG. 9 is a graft showing the rectangular raster.

Figure 10:
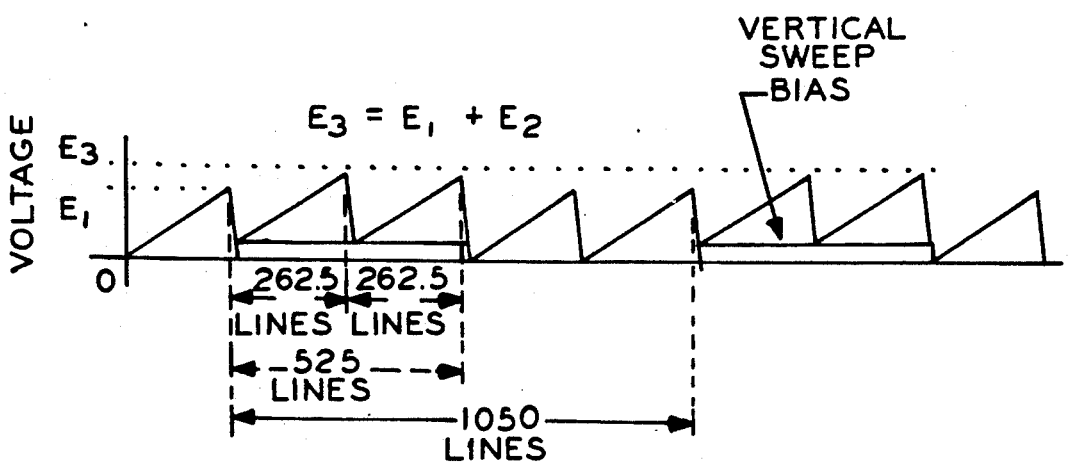

FIG. 10 is a graft showing the vertical bias of the invention.

DESCRIPTION OF THE INVENTION

In accordance with the invention the number of horizontal lines scanned in a scene is doubled so that each picture on the viewing screen is made up of four interlaced fields instead of the conventional two. In order to accomplish this result it is necessary to identify the uppermost field from the other fields of the scene and then each fourth frame thereafter. This is preferably accomplished by inserting an identification number code as video data during the time interval represented by line No. 19 of field No. 1. This provides the necessary I.D. Code without changing the transmitted NTSC format, thus allowing compatibility with conventional 525 line receivers. This I.D. would be recorded with the video by existing VCR recorders and similar recording equipment thus allowing 1050 or 525 line playback from such recorders.

Having identified the uppermost field in the multifield frame the sequence of transmitting the fields is important in maintaining NTSC compatibility. This can be done by frame interlacing, or reformatted field interlacing utilizing solid state camera technology.

The temporal transmission sequence is 1,3,2,4. The reformed picture field in a 1050 line format has a 1, 2, 3, 4 spatial picture field. The scanning circuit is designed to accommodate the required configuration by superimposing a rectangular pulse or vertical deflection onto Fields 3 and 4. Such a formatter may also be used to convert existing television receivers to produce a 1050 line picture. The sequence is as follows:

| Picture Field No. | 1 | 2 | 3 | 4 | 1 | 2 | 3 | 4 |
|---|---|---|---|---|---|---|---|---|
| Transmission Sequence No. | 1 | 3 | 2 | 4 | 1 | 3 | 2 | 4 |

The field sequence transmitted for reception can be identified because it consists of a pair of odd numbers followed by a pair of even numbers. A solid state imaging system has an internal scanning field pattern to conform with detector element and processor requirements.

Figure 1:
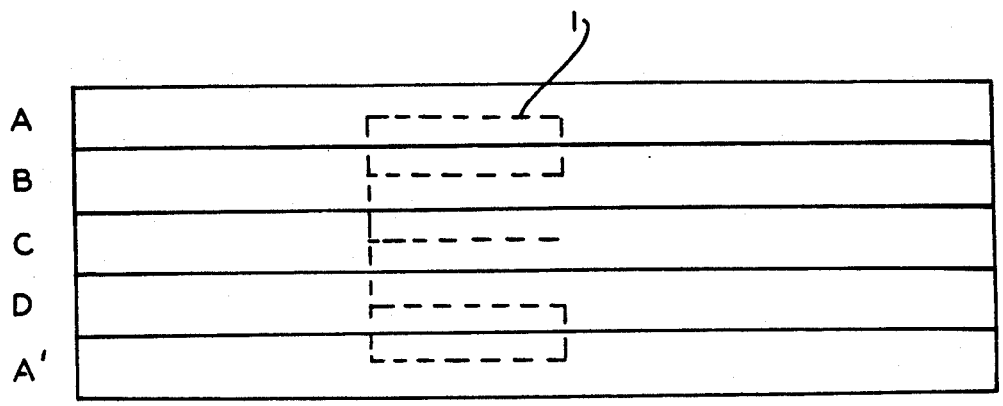
FIG. 1 is an illustration of a scene to be televised in relation to some of the scan lines.
Figure 2:
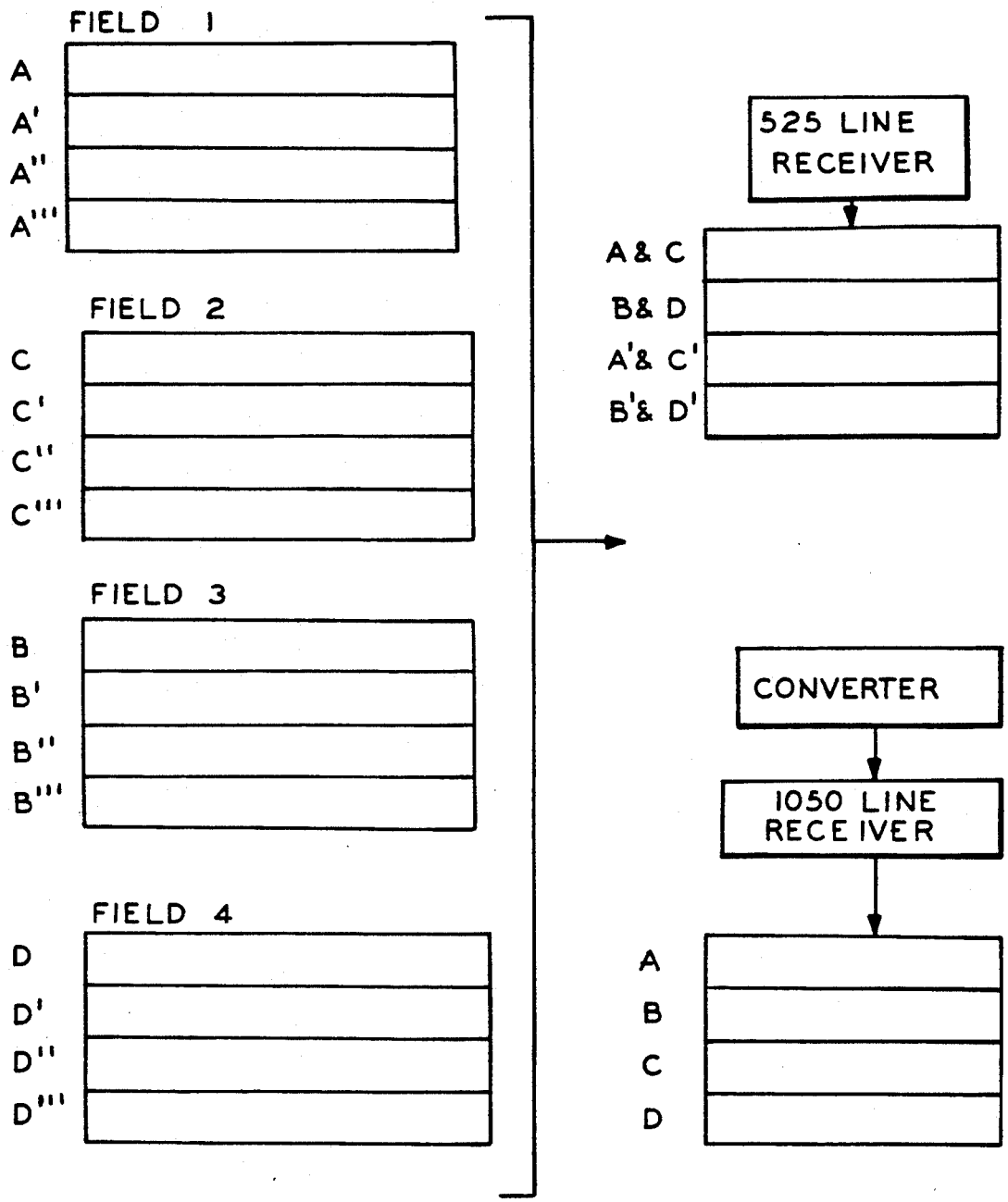
FIG. 2 is a block diagram of a television transmission and receiving system in accordance with the invention.

FIGS. 1 and 2 in combination show the relationship between the transmission and reception of a standard receiver which receives 525 lines and a receiver that can receive 1050 lines. Referring to FIG. 1 a portion of a scene to be transmitted is generally indicated at 1. Four of the 1050 scan lines are illustrated as lines A, B, C and D. Although not illustrated in the drawing the lines are on a slight incline to the right as is conventional in scanning. FIG. 2 illustrates the four fields as 1, 2, 3 and 4. Each field has 262.5 lines but only four are illustrated and marked as A, A', A" and A'". In like manner fields 2 to 4 are made up of 262.5 lines each with only four lines illustrated in the drawing as B, B', B",B'"; C, C', C", C'"; and D, D', D", D'". All four fields are transmitted to the receivers. In the standard receiver fields 2 and 4 will be on top of fields 1 and 3 i.e. lines B and D will be over lines A and C. The viewer will appear to see all of the lines simultaneously giving the same fidelity as in present day reception. The 1050 lines receiver will display all of the four fields interlaced which is illustrated as lines A, B, C and D.

Figure 3A:
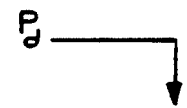
FIG. 3a is an illustration of a conventional raster.
Figure 3B:
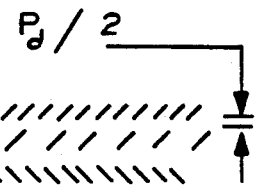
FIG. 3b is an illustration of a raster in accordance with the invention.

Referring to FIG. 3a which represents the prior art raster, the odd numbered lines (1, 3, 5, 7, etc . . . ) have the hatch pattern moving down to the left, and the even numbered lines, 2, 4, 6, 8, etc., are those with the hatch pattern moving down towards the right. The picture structure is such that there are 2 interlaced fields per picture frame (2 interlaced NTSC frames). Referring to FIG. 3b fields 3 and 4 are represented by lines 2-1, 2-2, 2-3, etc. Field 3 consists of the odd numbered lines 2-1, 2-3, 2-5, etc. and field 4 consists of the even numbered lines, 2-2, 2-4, 2-6, 2-8, etc. Not only are the fields of each frame interlaced but two consecutive frames are also interlaced. This configuration is the key to NTSC standard system compatibility.

When utilizing a digital processor the format must be maintained to store the R, B. G digitized data in memory for two complete 525 lines NTSC frames. The read out can be at 1050 lines per frame and consist of 2 fields per frame. In this case, each second line of each field contains updated transmitted picture information. HDTV receivers without a digital processor must reproduce the format exactly by operating at 4 fields per frame. The pixel thickness $P_d$ in FIG. 3b is ½ the NTSC line thickness shown in FIG. 3a. Thus, the lines in fields 3 and 4 consist of the image content information of the lower half of the lines in FIG. 3a. Similarly, the lines in fields 1 and 2 in FIG. 3b consist of the image content information of the upper half of the lines in FIG. 3a. This is the format used to store 2 NTSC frames (1050 lines) in the digital processor memory. This enables the software necessary to operate the digital process to be simple and cost effective.

As shown in FIG. 4, the vertical sweep contains a bias for fields #3 and #4 that is equivalent to ½ the conventional line thickness. The horizontal lines in field #3 and #4 are directly below those in their respective fields #1 and #2. One composite picture consists of fields #1, #2, #3 and #4. The identification code is inserted in line #19 during the vertical retrace interval following field #4. The purpose of the identification code is to remove the sweep bias from fields #1 and #2.

Television receivers designed to receive both 525 and 1050 line format can achieve the one-half line displacement from an internal rectangular waveform. The picture tube operating luminance is increased to accommodate the reduced frame rate so that the eye of the viewer perceives the same frame-time average brightness of the raster associated with a 1050 line format. This requires the modification of the video output amplifiers that drive the R, G, B grids of the picture tube.

This invention requires a modified studio camera whose optics and target signal are upgraded to have sufficient resolution elements to produce 1050 horizontal lines in four fields instead of 525 lines in two fields. In one embodiment of the invention the standard camera can be modified to send the 1050 line format by simply enlarging the image size by increasing the focal length of the lens. In order to retain the same horizontal resolution, the horizontal spacing between detector elements in solid state image elements is increased to accommodate the increased image size. The camera circuit inserts a frame identification code for frame No. 1 that is added to an appropriate horizontal line, preferably line No. 19, so that the first frames can be can be identified from the second frames by the television receiver. The identification code is used to synchronize the television receiver scanning system by adding and switching a signal so that a frame interlaced picture is displayed exactly as scanned in the studio by the camera. This gives enhanced picture resolution by doubling the number of lines without increasing the transmitted video bandwidth and conserving spectrum. The scanning system is synchronized by the identification signal when receiving a 1050 line enhanced signal but the frame interlace is of no consequence when receiving a 525 line picture. When utilizing a digital processor i.e. frame grabber, the digital processor information has a non-destructive readout capability at twice the input speed, then the video bandwidth within the receiver is increased to 10 mHz with 50% information update.

In a simplified form the invention creates in the camera four pixels for each previous pixel. Two of the pixels are in the vertical plane and therefore are merged and are of no significance to the invention. The other two pixels when viewed in vertical alignment on the viewing surface or viewing tube, each in a separate line, give the scene twice the definition or fidelity as with the single pixel. One way of accomplishing this is that the scene as viewed by the camera is enlarged (doubled) in size by doubling the size of the target plate. The picture is then scanned in the usual fashion of 525 lines (two fields of 262.5 lines each) except it is spread out evenly so there are evenly spaced gaps which allow the next scan which is off set slightly to pick up that portion of the scene missed by the first scanning. The four fields, two frames, are transmitted in the normal manner with the insertion of a code directing the receiver, which must have 1050 line capabilities, to interlace the fields and frames with the slight vertical bias so they are viewed together to make up the total scene with the 1050 lines. Since the standard receiver does not interpret the direction for the vertical bias, the two frames are shown on top of one another making up the transmitted scene with the normal 525 lines.

A second type of camera is illustrated in FIG. 5. In this system two conventional cameras are combined in one unit and their signals are combined for transmission. The scene seen through the lens is passed through a beam splitter which sends the same scene to each camera with the scene sent to the second camera being slightly offset i.e. one half line. The combination camera is equipped with a single lens system which has an objective lens 21, a field lens 22 and two relay lenses 23 and 24. The lens causes the scene viewed to pass through a beam splitter which sends the identical scene to each camera. The scene passes through a transparent plate 25 in the beam splitter to the first camera target plate indicated at 26. The plate 25 also reflects the scene to a mirror 27 which directs the same scene to the target plate 28 of the second camera. The mirror is adjusted so the scene shown on plate 28 is one half line lower than that on signal plate 26. This offset allows the transmission of the second fields with the one half line offset. The two cameras are connected to a field switching processor 29 which contains a switch generally indicated at 30 for controlling the sequence of transmission of the four fields making up the two frames which are interlaced in the 1050 line receiver.

It should be understood that a conventional 1050 line camera can also be utilized. Such a camera is adjusted to place the identification code in the video so the four fields, two frames transmitted are interlaced in the receiver.

The receiver functions in the normal manner except that it is instructed by a code to interlace at a slight bias the second frame so that it fills the space between the first frame. With a standard receiver which does not interpret the code the frames are shown on top of one another in sequence making the system compatible. Such modifications to a receiver which utilizes the single gun tube is a simple matter of circuitry. A receiver utilizing a shadow mask would have to be modified to create enough apertures in the mask for the 1050 lines. Using a digital system is easier from a circuit standpoint.

One embodiment of the invention a bias coil is added to the picture tube vertical deflection coils with sufficient response time to instrument the bias requirement when a digital process is not used. A rectangular wave oscillator whose frequency is 59.94/4=14.985 HZ is synchronized to both the pulse code contained in line 19 and to the regular vertical synch pulse. The normal vertical synch pulse opens a gate long enough to pass the frame I.D. pulse in line 19 if it is present during the gate ON time interval. This enables the 14.985 Hz rectangular wave to cause a synchronized current to flow through the bias coil. A potentiometer is part of the circuit to adjust the bias current value for controlling alignment of frame interlacing. The rectangular wave current flowing through the bias coil adds and subtracts its magnetic field to that produced by the vertical deflection coils and produces the required bias level.

In FIG. 6, a television receiver picture tube is generally illustrated at 100. The picture tube 101 has two circular deflection coils 102 and 103 which surround the neck of the tube which direct the flow of electrons to the surface 105 of the tube 101. One of the deflection coils has a pulse generator 104 attached which controls the electron flow for the frames No. 3 and 4 giving these frames a slight off-set as compared with the deflection of the electrons for frames 1 and 2 to create the interlace of the four frames.

FIG. 7 is a block diagram for creating the deflection of the second frame. The vertical sync is fed into a sync separator 51 and then to a gate 52. The I.D. code pulse is also feed into the gate 52. The signal then is feed to a bias waveform generator 53. The waveform has a phase angle adjustment generally indicated at 54 to allow adjustment of the pulse. The output goes to the vertical bias deflection coil on the viewing tube (not shown).

One of the major features of the invention is that it presents a high fidelity TV picture which is completely compatible with existing equipment by dividing each line into two parts and viewing such two parts at approximately the same time. The conversion appears in the horizontal lines on the receiving or viewing phase although the lines are in a vertical configuration.

The system does not require an increase in transmitted bandwidth since it employs the information in each succeeding frame to update 50% of the field lines in the 1050 line picture.

Since each transmitted frame contains the complimentary half of the previous frame, when a HDTV picture is displayed the two frames are superimposed onto each other such that they are interlaced. The second frame contains the video information of the optical lower half of the original NTSC lines. Frame interlacing is accomplished by adding a vertical deflection bias to the vertical deflection of frame #2 such that fields #3 and #4 are placed below the corresponding lines of the previous frame, exactly as they were scanned by the modified studio camera. An identification code for Frame #1 is transmitted on line 19 during the vertical retrace time of field #4.

In accordance with the invention there are two systems for HDTV Image display. The first option consists of frame interlacing directly on the picture tube without any digital processing. The 15 frames per second at a field rate of 60 per sec will provide a picture that is substantially improved over present day NTSC standards. A digital processor embodiment which can be used to store the two complementary frames (525 lines×2 frames=1050 lines). It also allows the picture tube to be scanned at 1050 lines per frame at a 30 frame per sec rate. The information content is repeated when producing the observed picture. This allows the present transmitted bandwidth to be retained; thus, each 1050 line frame has a 50% information update in interlaced form. This frame-interlacing approach also allows a gradual transition for future bandwidth increase with minimum economic impact on the public. The digital processor option may be utilized to drive either solid state displays or picture tubes.

This invention can be adopted immediately without interrupting present day operation. In addition, the huge public capital investment in present day equipment will retain its value. Furthermore, the consumer television receivers manufactured according to the described design modification in this patent will be capable of either kind of reception; older models will also continue to operate when receiving a signal with the enhanced 1050 line resolution format. This will enable a natural transition to occur from 525 to 1050 line television without placing a huge financial burden on the public. In addition, the huge investment in VCR equipment and recordings will also be salvaged. Video tapes will continue to operate on VCRs equipped with this patent.

If a high definition television picture tube with twice the number of shadow mask horizontal apertures as in conventional picture tubes is used, then the picture quality will be improved even though the transmitted bandwidth has not increased. This occurs because the full spatial frequency spectrum was not fully displayed. Quantized pixel frequency distortions are reduced by increasing shadow mask triads because the video signal is a continuous function along the horizontal line. The shadow mask apertures and color dot triads quantize the pixel into a lumped parameter that is an average value over approximately a 100 nanosecond time interval.

Another factor that contributes to deterioration of the observed picture tube MTF is the influence of the line spread function perceived by the eye as the black/dark lines between the active raster. This line spread function influence also contributes to perceived flicker. Such MTF deterioration is reduced by increasing the density of illuminated color dot triads in the picture.

As illustrated in FIG. 5, the studio camera is modified so that 2 frames can be interlaced. This requires a vertical bias physically equivalent to approximately ½ the present camera pixel thickness and is inserted into the vertical sweep during every other frame. Thus, the vertical retrace interval of field #4 must include code to identify frame #1 from frame #2.

Present NTSC standards already include the capability to place an I.D. code during a vertical retrace interval as shown in FIG. 1. This code acts to synchronize the receiver such that line #1 of frame #1 is physically above #1 of frame #2, exactly as the studio camera scanned the scene. Field interlacing occurs naturally for an odd number of horizontal lines. As described in the above reference; however, a vertical reflection bias must be added to every other frame to interlace frames.

An I.D. pulse code for frame #1 is located on line 19 of the vertical retrace of field #4. It enables the receiver to keep track of the frames so that every second NTSC frame has a bias corresponding to a physical displacement of ½ the present pixel diameter, $P_d$. Older consumer television receivers not equipped with this design change will continue to operate normally since the video information in line #1 is the average of the information in both lines 1-1 and 2-1 of frames #1 and #2. Consumer television receivers equipped with this change (either with or without a digital processor) have the capability to double the picture vertical resolution when receiving signal from those television channels equipped with the patent.

FIGS. 8 to 10 are best considered in connection with FIG. 4. FIG. 8 is a graph which shows the conventional television signal transmission but illustrating four fields. The picture field sequence is 1, 3, 2 and 4 but after or during transmission the transmission sequance is referred to in the order of transmission. FIG. 9 is a graft which shows the raster rectangular pulse bias. FIG. 10 is a graph which illustrated the difference between 525 line transmission and 1050 line transmission. Also illustrated is the vertical bias necessary to allow interlacing of the two fields.

While the invention has been described in its preferred embodiment, it is to be understood that the words which have been used are words of description rather than limitation and that changes may be made within the purview of the appended claims without departing from the true scope and spirit of the invention in its broader aspects.

What is claimed is:

1. In a television transmission system including a camera with an aperatured lens and containing means for converting an optical scene or picture viewed through the lens into an electronic scan signal comprising two fields which when interlaced give approximately 525 horizontal lines which duplicate the scene, a target signal containing the two frames, means for sending such target signal in a band width of approximately 4.2 mHz to a receiver containing a viewing screen, means for interlacing the two frames for converting such signal into the original scene on the viewing screen in approximately 525 horizontal lines, the improvement which comprises increasing the fidelity of the scene on the viewing screen by increasing the lines to about 1050 lines without changing the transmission band width by modifying the aperture of the camera so that two lines are transmitted for each former line, one of the two lines containing the information in the upper half of the former line and the other of the two lines containing the information in the lower half of the original line, inserting a signal to indicate the start of the next four fields to be transmitted, utilizing a frame interlacing means whereby the complimentary half of the previous frame is superimposed on the succeeding frame with a slight vertical deflection to substantially double the number of lines on the viewing screen.

2. The system of claim 1 wherein the vertical deflection bias is added to the vertical deflection of each second frame such that fields #3 and #4 are placed below the corresponding lines of the previous frame.

3. The system of claim 2 wherein an identification code for frame #1 is transmitted on line #19 during every fourth vertical retrace for vertical bias control.

4. The system of claim 1 wherein the camera is equipped with a reduced scanning beam aperture size such that each frame of #1 contains all the pixel information in the optical upper half of each previous line and the corresponding lower half pixels are scanned in the corresponding next frame.

5. The system of claim 1 wherein the camera target signal is upgraded to produce sufficient resolution elements to produce 1050 lines in four fields and a frame identification code for frame #1 is added to line #19 during every fourth vertical retrace for vertical bias control.

6. The system of claim 5 wherein an identification code for frame #1 is transmitted on line #19 during the vertical retrace time of field #4.

7. The system of claim 1 where the viewing screen is a cathode ray tube and the tube has a first and second deflection coil, the second deflection coil has a pulse generator attached which controls the electrode flow for the frames No. 3 and 4 whereby such frames are given a slight off-set as compared with the deflection of the electrons for frames 1 and 2 to create an interlace of the four frames.

8. The system of claim 1 wherein the camera is equipped with a target plate to allow the scanning of four fields.

* * * * *